United States Patent
Cheron et al.

(10) Patent No.: US 6,973,984 B2
(45) Date of Patent: Dec. 13, 2005

(54) STRUCTURAL PART FOR THE FRONT OF A MOTOR VEHICLE, SAID PART BEING PROVIDED WITH A CONVERGING PORTION, AND A FRONT END MODULE CONSTITUTING SUCH A STRUCTURAL PART

(75) Inventors: Hugues Cheron, Meximieux (FR); Gerald Andre, Amberieu En Bugey (FR); Pascal Carrier, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/315,011

(22) Filed: Dec. 10, 2002

(65) Prior Publication Data
US 2003/0178235 A1   Sep. 25, 2003

(30) Foreign Application Priority Data
Dec. 11, 2001   (FR) .................................. 01 16011

(51) Int. Cl.$^7$ ............................................. B60K 11/04
(52) U.S. Cl. .................... 180/68.1; 180/68.4; 180/68.6
(58) Field of Search .............................. 180/68.1, 68.4, 180/68.6; 280/781, 785; 296/203.02

(56) References Cited

U.S. PATENT DOCUMENTS

| | | | | |
|---|---|---|---|---|
| 5,658,041 A | * | 8/1997 | Girardot et al. | 296/193.09 |
| 6,155,335 A | * | 12/2000 | Acre et al. | 165/41 |
| 6,450,276 B1 | * | 9/2002 | Latcau | 180/68.4 |
| 6,502,653 B1 | * | 1/2003 | Balzer et al. | 180/68.4 |
| 6,540,037 B2 | * | 4/2003 | Sasano et al. | 180/68.1 |
| 6,547,317 B1 | * | 4/2003 | Cheron et al. | 296/193.01 |
| 6,578,650 B2 | * | 6/2003 | Ozawa et al. | 180/68.1 |
| 6,679,545 B1 | * | 1/2004 | Balzer et al. | 296/193.09 |
| 6,681,876 B1 | * | 1/2004 | Haneda et al. | 180/68.4 |
| 6,715,573 B2 | * | 4/2004 | Emori et al. | 180/68.4 |
| 6,729,424 B2 | * | 5/2004 | Joutaki et al. | 180/68.4 |
| 6,742,615 B2 | * | 6/2004 | Cristante et al. | 180/68.4 |
| 2001/0010275 A1 | * | 8/2001 | Sasano et al. | 180/68.1 |
| 2001/0011614 A1 | * | 8/2001 | Sasano et al. | 180/68.1 |
| 2001/0045310 A1 | * | 11/2001 | Ozawa et al. | 180/68.1 |
| 2002/0070062 A1 | * | 6/2002 | Joutaki et al. | 180/68.4 |
| 2002/0084122 A1 | * | 7/2002 | Emori et al. | 180/68.4 |
| 2002/0129981 A1 | * | 9/2002 | Satou | 180/68.6 |
| 2004/0084236 A1 | * | 5/2004 | Okai et al. | 180/68.4 |

FOREIGN PATENT DOCUMENTS

| | | | | |
|---|---|---|---|---|
| DE | 4023042 A1 | * | 1/1992 | ......... B62D 25/16 |
| EP | 1 067 039 A1 | | 1/2001 | |
| WO | WO 99/54187 | | 10/1999 | |

* cited by examiner

Primary Examiner—J. Allen Shriver
(74) Attorney, Agent, or Firm—Oliff & Berridge, PLC

(57) ABSTRACT

The invention relates to a front structural part for a motor vehicle, the structural part being shaped in such a manner as to leave a location for a cooling assembly, said location (5) constituting a passage for the air that exchanges heat with the cooling assembly, said structural part being provided with a converging portion (7) having the function of reducing the air flow section around the cooling assembly. The converging portion is made integrally with the structural part. The invention also relates to a front end module.

9 Claims, 3 Drawing Sheets

STRUCTURAL PART FOR THE FRONT OF A MOTOR VEHICLE, SAID PART BEING PROVIDED WITH A CONVERGING PORTION, AND A FRONT END MODULE CONSTITUTING SUCH A STRUCTURAL PART

The present invention relates to a front structural part for a motor vehicle, the part being provided with a converging portion for a cooling assembly, and the invention also relates to front and module constituting such a structural part.

It is well known that the safety specifications for a motor vehicle require that its hood should be kept securely closed in the event of an accident. That is why it is important for the top cross-member of the engine compartment, or more generally any structural part to which the hood is fastened, should present sufficient strength to withstand forces tending to pull off the hood.

Concerning forces along the same axis but in the opposite direction, it is also necessary to ensure that slamming the hood shut gives rise to little sagging of the structural part.

This requirement for said structural part to be strong relates to the entire part, and above all to its region that carries the hood lock.

Furthermore, it is necessary for the structural part to present a degree of inertness in the face of vibration frequencies that are known to run the risk of setting it into resonance.

The present invention seeks to propose a solution for reinforcing a front structural part of a motor vehicle.

The present invention provides a front structural part for a motor vehicle, said structural part being shaped in such a manner as to leave a location for a cooling assembly, said location constituting a passage for the air that exchanges heat with the cooling assembly, said structural part being provided with a converging portion having the function of reducing the air flow section around the cooling assembly, and being characterized in that the converging portion is made integrally with the structural part.

Thus, the invention consists in incorporating within the structural part a part that is normally initially separate and subsequently fitted thereto, i.e. the converging portion which is also known as a screen. The usual function of the converging portion is to reduce the flow section for air, but because it is fixed to the structural part at a few points only it is not capable of performing a structural function.

By means of the invention, the converging portion becomes structural merely because it is formed integrally with the structural part and contributes to the rigidity of said structural part. It can even be given thickness greater than the thickness of a conventional converging portion since even though such an increase in thickness appears a priori to be harmful in terms of weight, it can be justified by the resulting improvement in the mechanical qualities of the structural part. The increase in the weight of the converging portion can thus be compensated to a large extent by a reduction in the weight of the structural part or by eliminating some other reinforcement that has been made unnecessary. In addition, compared with a separate fitted converging portion, the converging portion of the invention can compensate for its extra weight by the absence of any fastenings connecting said converging portion to the structural part.

In a particular embodiment of the invention, the converging portion is made of the same material as the structural part.

In order to give even more rigidity to the structural part, the converging portion may be ribbed, thus enabling it also to serve as a support for functional members such as a horn or a sensor for triggering airbags.

In a particular embodiment, the structural part is a top cross-member.

A particularly advantageous example of a structural part of the invention is as a front end module (or an equipment-carrying front face) of a motor vehicle.

Under such circumstances, the location for the cooling assembly is situated beneath a top cross-member of the equipment-carrying front face, and the converging portion is situated beneath the cross-member.

The front end module is advantageously made as a single piece, although it could also be obtained by assembling together parts that are distinct, but united in such a manner that the front end module presents the required rigidity, ignoring the contribution of the converging portion.

In a preferred embodiment, the converging portion is made integrally not only with the top cross-member but also with downwardly-directed side legs of the top cross-member.

To make the invention easier to understand, there follows a description of an embodiment given by way of non-limiting example and made with reference to the accompanying drawings, in which.

Figure 1:
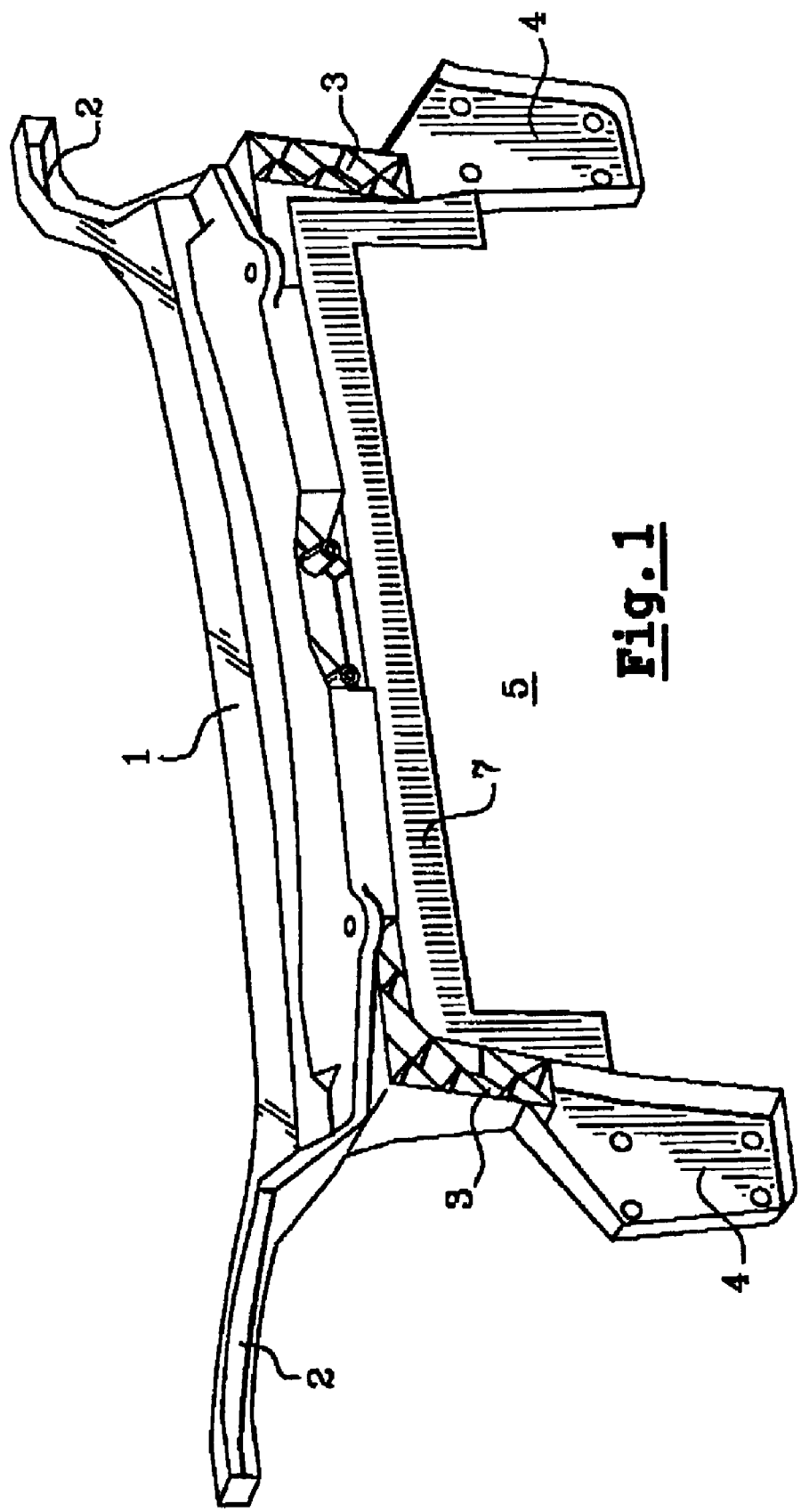
FIG. 1 is a perspective view of a front end module (equipment-carrying front face)
Figure 2:
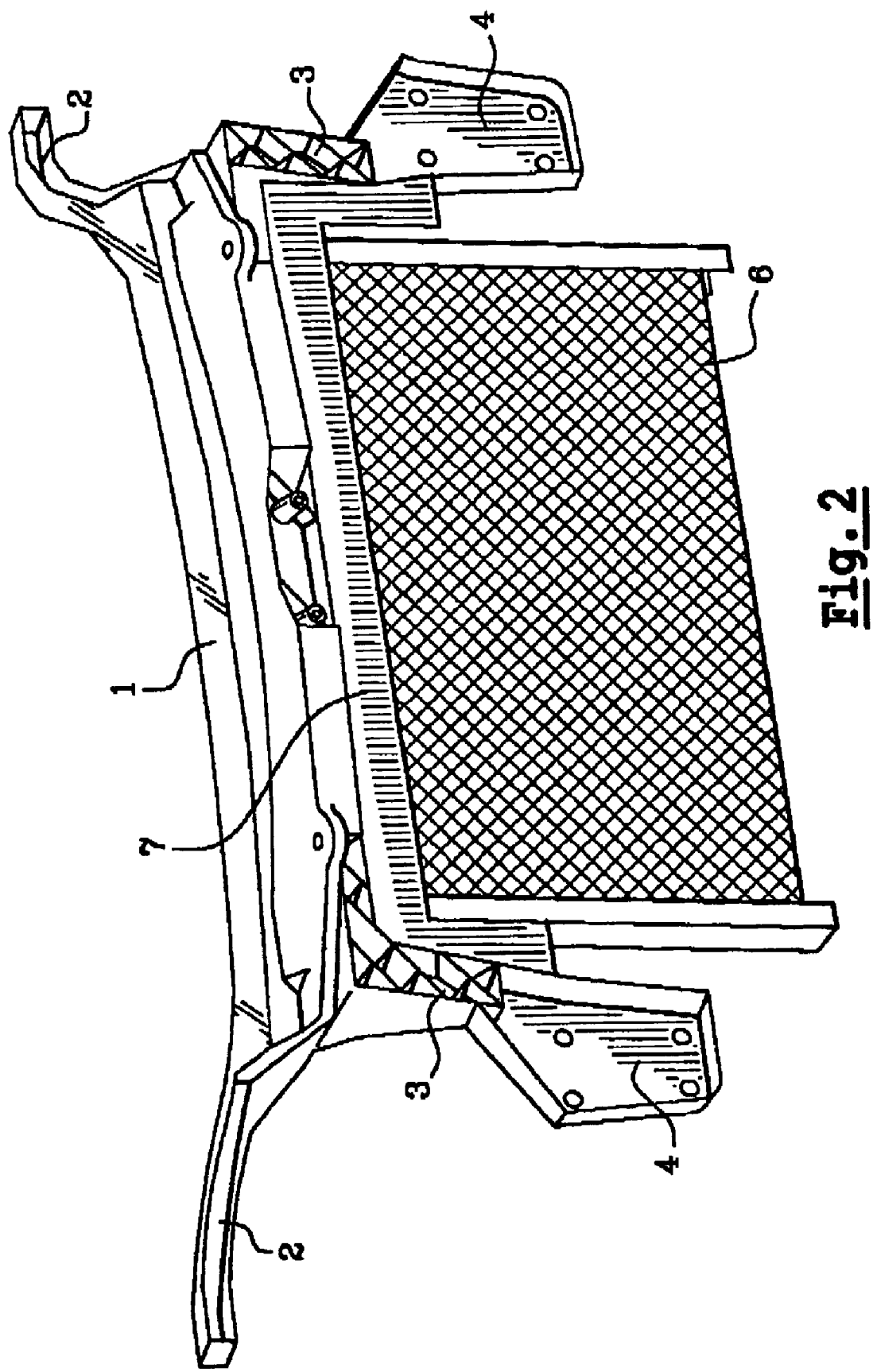
FIG. 2 is a view analogous to FIG. 1 showing a cooling assembly fitted to the front end module.
Figure 3:
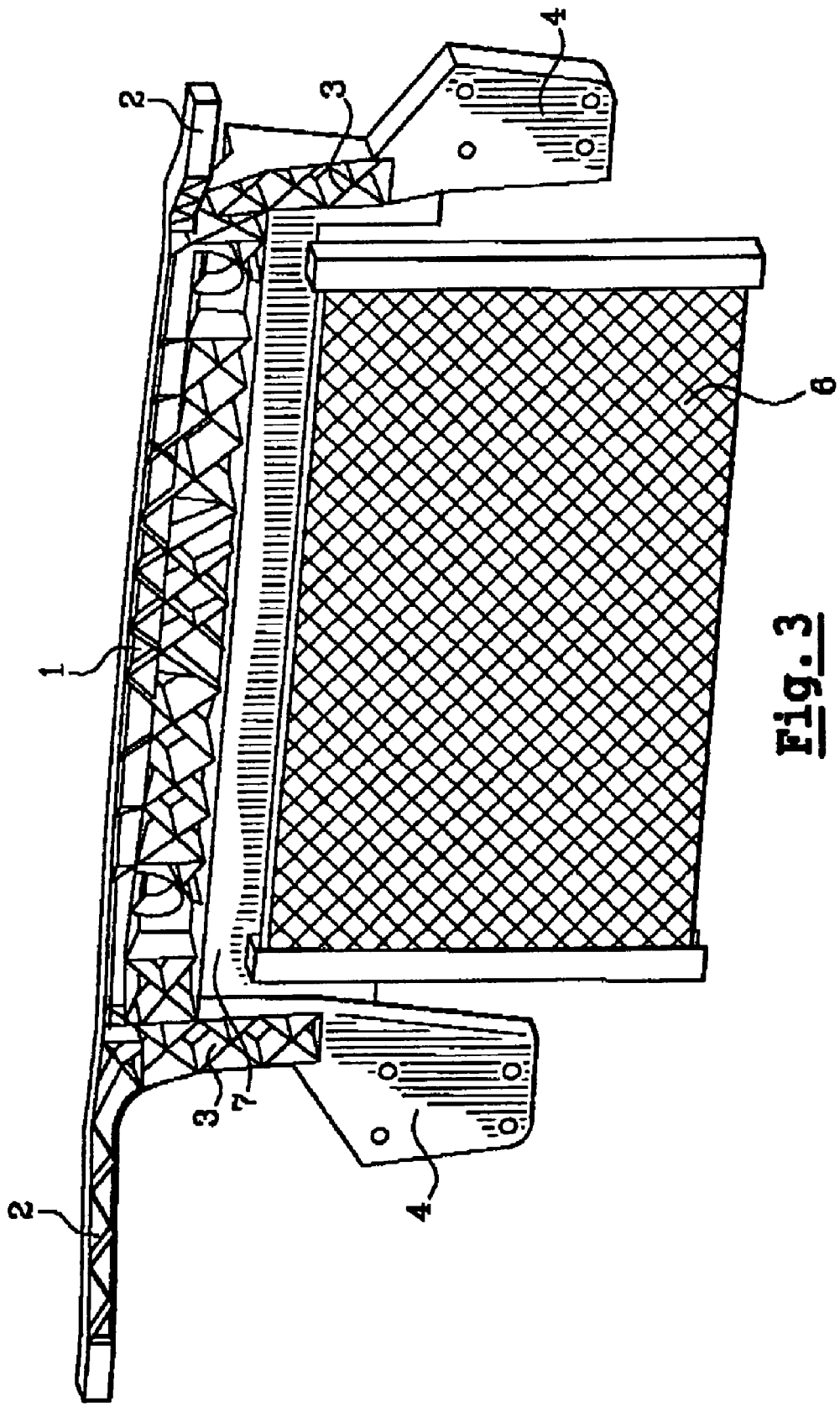
FIG. 3 is a rear view of the assembly shown in FIG. 2.

This front end module comprises a top cross-member 1 extended at each of its ends by a support part 2 for fixing to the structure of the vehicle, for example a fender-lining support (not shown).

Each support part 2 is designed to support functional members (not shown) such as headlight units.

A side leg 3 extends downwards from each of the ends of the cross-member to a plate 4 for fixing to a side rail (not shown) of the vehicle.

It can be seen that the front end module as made in this way leaves a location 5 between the top cross-member 1 and the legs 3 for receiving a cooling assembly 6 constituted by a radiator and a fan unit (not shown in detail) under the top cross-member.

In accordance with the invention, a converging portion 7 is located adjacent to the two legs and the top cross-member, being formed integrally with the front end module as a whole, e.g. by injection molding polypropylene.

The converging portion is dimensioned to satisfy two criteria. Firstly, its area in the general plane of the front face is determined as a function of the shape of the cooling assembly and of the air flow section that needs to be closed off in order to optimize heat exchange between the air and the cooling assembly. Secondly the thickness of the converging portion is determined as a function of the rigidity that it is desired to impart to the front face by taking advantage of the presence of the converging portion, in particular the rigidity of the top cross-member which must be capable of withstanding forces coming from the hood.

Naturally the embodiment described above is not limiting in any way and any useful modification can be made thereto without thereby going beyond the ambit of the invention.

What is claimed is:

1. A front structural part for a motor vehicle, said front structural part comprising a top cross-member arranged to enable a hood to be fastened thereto, and being shaped in such a manner as to leave a location for a cooling assembly, the location for receiving the cooling assembly being situated beneath the top cross-member, said location constituting a passage for the air that exchanges heat with the cooling assembly, said front structural part being provided with a converging air guide having the function of reducing the air flow section around the cooling assembly, the converging air guide extending all along the top cross-member, and wherein the converging air guide is made integrally with the structural part and contributes to the rigidity of the top cross-member.

2. The front structural part according to claim 1, characterized in that the converging air guide is made of the same material as the structural part.

3. The front structural part according to claim 1, characterized in that the converging air guide is ribbed.

4. The front structural part according to claim 1, characterized in that the converging air guide serves as a support for functional members.

5. The front structural part according to claim 1, characterized in that the front structural part is the top cross-member.

6. The front structural part according to claim 1, characterized in that the front structural part is a front end module of the motor vehicle.

7. The front structural part according to claim 6, characterized in that the converging air guide is situated beneath the cross-member.

8. The front structural part according to claim 6, characterized in that the front structural part is made as a single piece.

9. The front structural part according to claim 6, characterized in that the converging air guide is made integrally with the top cross-member and legs extending downwardly from the top cross-member.

* * * * *